United States Patent [19]

Manzoni

[11] Patent Number: 4,951,912
[45] Date of Patent: Aug. 28, 1990

[54] RETRACTABLE REARVIEW MIRROR SELF-LOCKED IN POSITION FOR PARKING AND IN POSITION FOR USE WITH RETURN WITHOUT RISK OF PINCHING THE FINGERS

[75] Inventor: Bernard Manzoni, Saint-Claude, France

[73] Assignee: Societe Manzoni Bouchot, France

[21] Appl. No.: 437,654

[22] Filed: Nov. 16, 1989

[30] Foreign Application Priority Data

Nov. 16, 1988 [FR] France .................................. 88 14898

[51] Int. Cl.⁵ ............................................... A47G 1/16
[52] U.S. Cl. .................................. 248/475.1; 350/632; 248/549; 248/900
[58] Field of Search ..................... 248/479, 475.1, 476, 248/480, 466, 478, 485, 486, 487, 549, 900; 350/632, 604, 633, 638, 631

[56] References Cited

U.S. PATENT DOCUMENTS

| | | | |
|---|---|---|---|
| 4,606,619 | 8/1986 | Yamana | 248/486 X |
| 4,692,000 | 9/1987 | Wada et al. | 248/478 X |
| 4,836,490 | 6/1989 | Mittelhauser et al. | 248/549 |
| 4,840,475 | 6/1989 | Herzog et al. | 248/475.1 X |
| 4,872,636 | 10/1989 | Mittelhauser et al. | 248/475.1 |

*Primary Examiner*—Ramon O. Ramirez
*Attorney, Agent, or Firm*—Remy J. VanOphen

[57] ABSTRACT

In addition to a base and a mirror-holder casing, the rearview mirror has a front-to-rear tilting piece articulated by a member for permanent forward pivoting relative to the casing and a member for permanent rearward pivoting relative to the base and coupled by a spring to the casing, which is further connected to the base at the front by a retractable pivoting member and at the rear by a sliding pivoting member, a locking member with elastic return being mounted on the tilting piece and cooperating selectively with two notches in the base defining the positions of use and of parking of the casing.

12 Claims, 5 Drawing Sheets

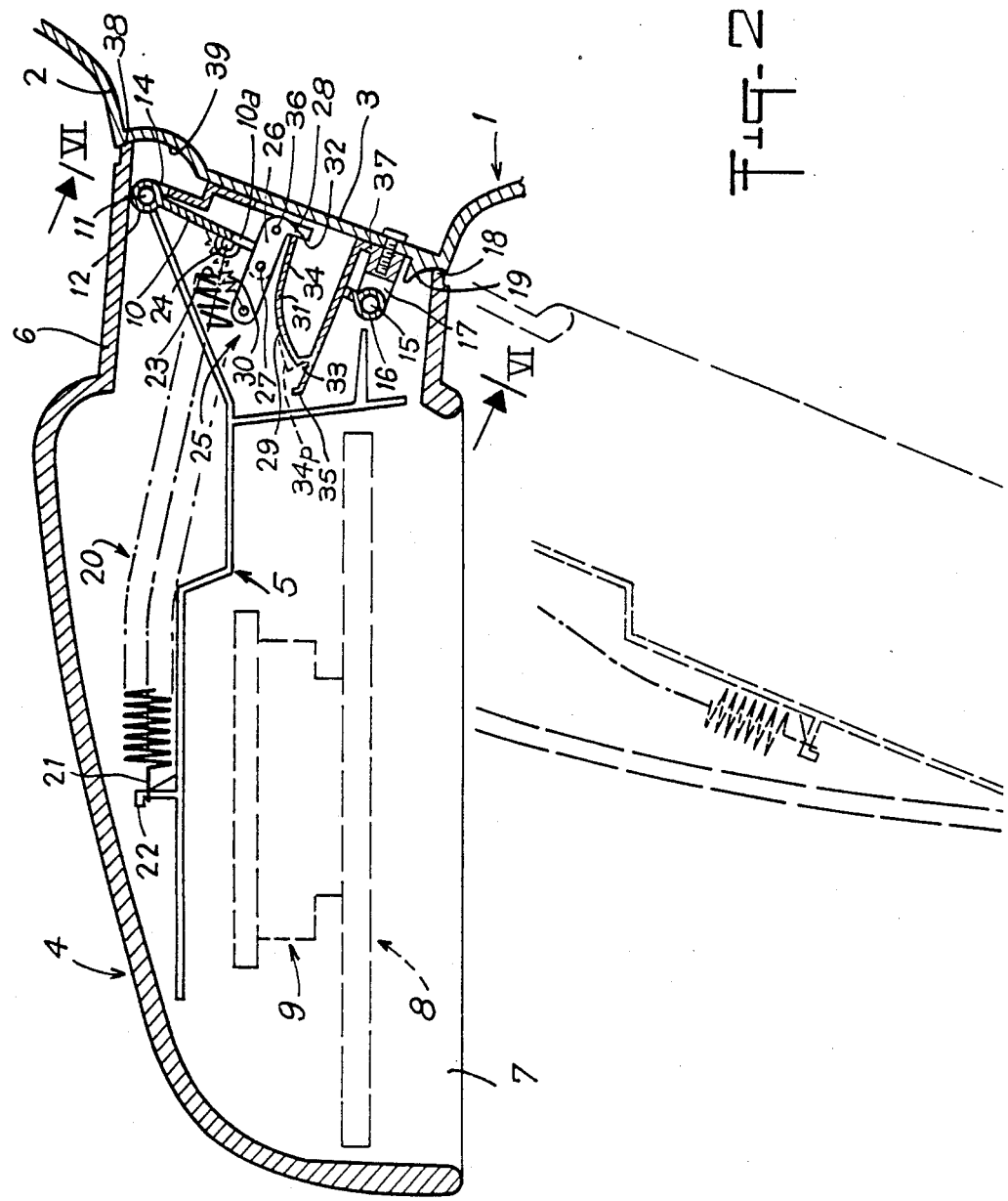

RETRACTABLE REARVIEW MIRROR SELF-LOCKED IN POSITION FOR PARKING AND IN POSITION FOR USE WITH RETURN WITHOUT RISK OF PINCHING THE FINGERS

BACKGROUND OF THE INVENTION

The present invention relates to a retractable rearview mirror self-locked in position for parking and in position for use wherein the risk of pinching one's fingers is eliminated.

The invention concerns a retractable rearview mirror of the type having a base adapted to be fixed on the vehicle, a mirror-holder casing applied, in position of use, against the base via two pivoting members distant from each other in the front-to-rear direction, a spring tending to maintain contact between the casing and the base, as well as a mirror disposed in the casing and mobile relative thereto under the action of a control device.

The purpose of the invention is to:
 allow the casing to retract forwardly under the effect of a rearward shock and to return automatically into a position of use;
 allow the casing to retract rearwardly under the effect of a forward shock and to return automatically into a position of use;
 allow the casing to be positioned and locked in a parking position in which it is bent rearwardly near the vehicle; and
 allow the casing to return automatically when it is released from the parking position towards the position for use, without risk of pinching one's fingers when it is locked in position for use.

SUMMARY OF THE INVENTION

In order to attain the above purposes in accordance with the invention, the rearview mirror includes a front-to-rear tilting piece disposed near the base in the casing which is articulated by means of a member for permanent forward pivoting relative to the casing and a member for permanent rearward pivoting relative to the base and which is coupled between the members to the casing by a return spring. The casing is connected to the base at the front by a retractable pivoting member and at the rear by a sliding pivoting member located nearer the base than the rear pivoting member of the tilting piece and more to the rear than the rear pivoting member, so that, when the casing pivots from front to rear, the tilting piece pivots relative thereto, moving away from the point of attachment of the return spring in the casing and stretching the spring. A locking member with elastic return is also mounted on the tilting piece and cooperates selectively with two notches in the base defining the position of use of the casing and the position for parking.

According to a particularly advantageous embodiment, the permanent forward pivoting member and the retractable forward pivoting member of the tilting piece are coaxial; the permanent forward pivoting member is preferably a shaft passing through a sleeve and a fork joint integral with the tilting piece and the casing. The shaft projects opposite at least one half-bearing of the base in order to constitute the retractable pivoting member.

The permanent rearward pivoting member is a shaft passing through a sleeve and a fork joint integral with the tilting piece and the base.

The rearward sliding pivoting member is constituted by a part of the edge of the casing abutting by the return spring against a ramp of the base projecting outwardly.

The locking member is a lever mounted to pivot on the tilting piece which has a projecting tooth capable of cooperating selectively with two notches of a cam forming part of the base.

The cam presents an arcuate part concentric to the rearward pivoting member of the tilting piece. The arcuate part is connected to the locking notch in the position of use by a ramp with an increasing radius.

A stop element forming part of the base cooperates with a stop on the tilting piece to define the parking position of the casing.

BRIEF DESCRIPTION OF THE DRAWINGS

The invention will be more readily understood on reading the following description with reference to the accompanying drawings, in which:

FIG. 2 is a longitudinal sectional view illustrating the means for connecting the casing with the base in the position for use;

DETAILED DESCRIPTION OF THE PREFERRED EMBODIMENT

Figure 1:
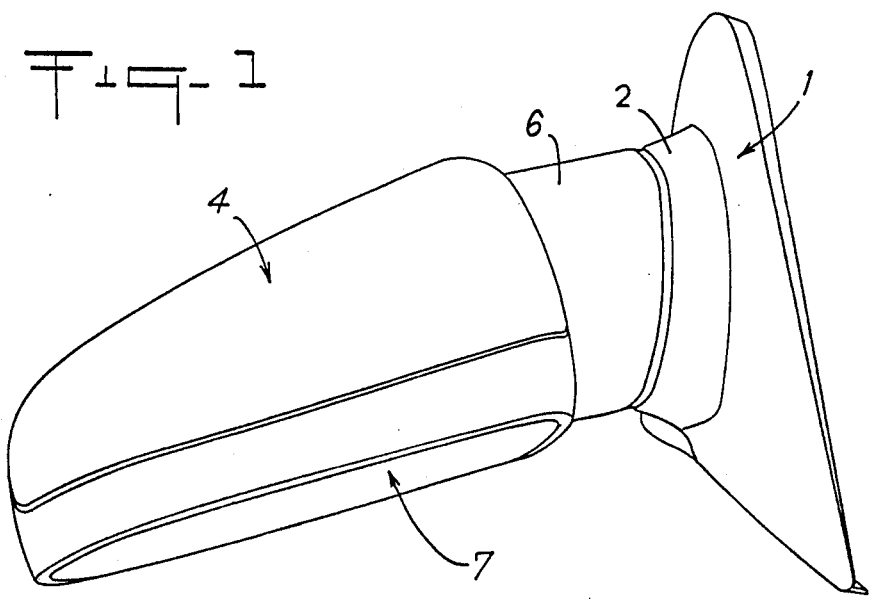
FIG. 1 is a plan view showing the rearview mirror according to the invention.

Referring now to the drawings, the rearview mirror includes a base 1 made of injected material (thermoplastic or non-ferrous) adapted to be applied on the bodywork or a door of an automobile vehicle and to be fixed thereto by any appropriate means. The base presents an outwardly projecting neck 2 closed by a bottom 3.

The rearview mirror also includes a retractable casing 4 made of molded plastic material and fixed on a mount 5 made of injected material (thermoplastic or non-ferrous). The casing 4 presents a tubular sleeve 6 extending the neck 2 of the base 1. The casing 4 defines a rear window 7 in which extends a mobile mirror 8 supported, via an orientation device 9, by the mount 5. The orientation device 9 presents two right-left and upward-downward pivot axes respectively; in addition, it is connected to a selective actuating handle (not shown) by a transmission which is of the cable type, but which may also be of an electrical or other type.

A front-to-rear tilting piece 10 is interposed between the base 1 and the casing 4. It extends in the sleeve 6 of the casing substantially parallel to the bottom 3 of the neck 2 of the base when the rearview mirror is in position for use.

As shown in FIG. 2, the tilting piece 10 is mounted to pivot forwardly in a permanent manner relative to the casing 4 and is mounted to pivot forwardly in a retractable manner relative to the base 1. As also illustrated, the tilting piece 10 is mounted to pivot rearwardly in a permanent manner relative to the base 1 and the casing is mounted to pivot rearwardly in a sliding manner relative to the base 1.

Figure 6:
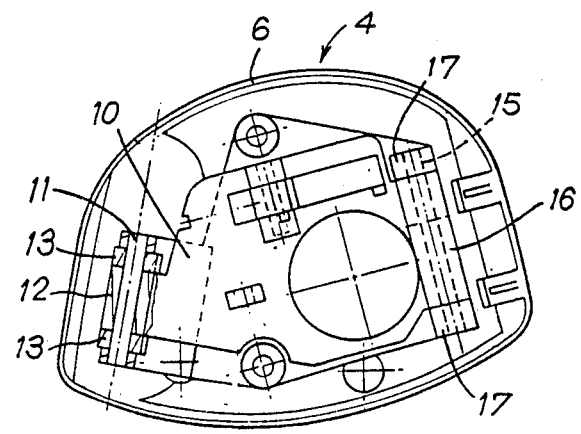
FIG. 6 is a side view taken along line VI—VI of FIG. 2.

In the example shown and as is clearly visible in FIGS. 2 and 6, permanent forward pivoting of the casing 4 relative to the tilting piece 10 is effected by means of a pivot shaft 11 passing through a sleeve 12 of the tilting piece 10 and a fork joint 13 of the mount 5 of the casing. Branches of the fork joint fit on the sleeve with a minimum clearance on the ends thereof. Of course, the sleeve may form part of the mount and the fork joint with the tilting piece.

Figure 3:
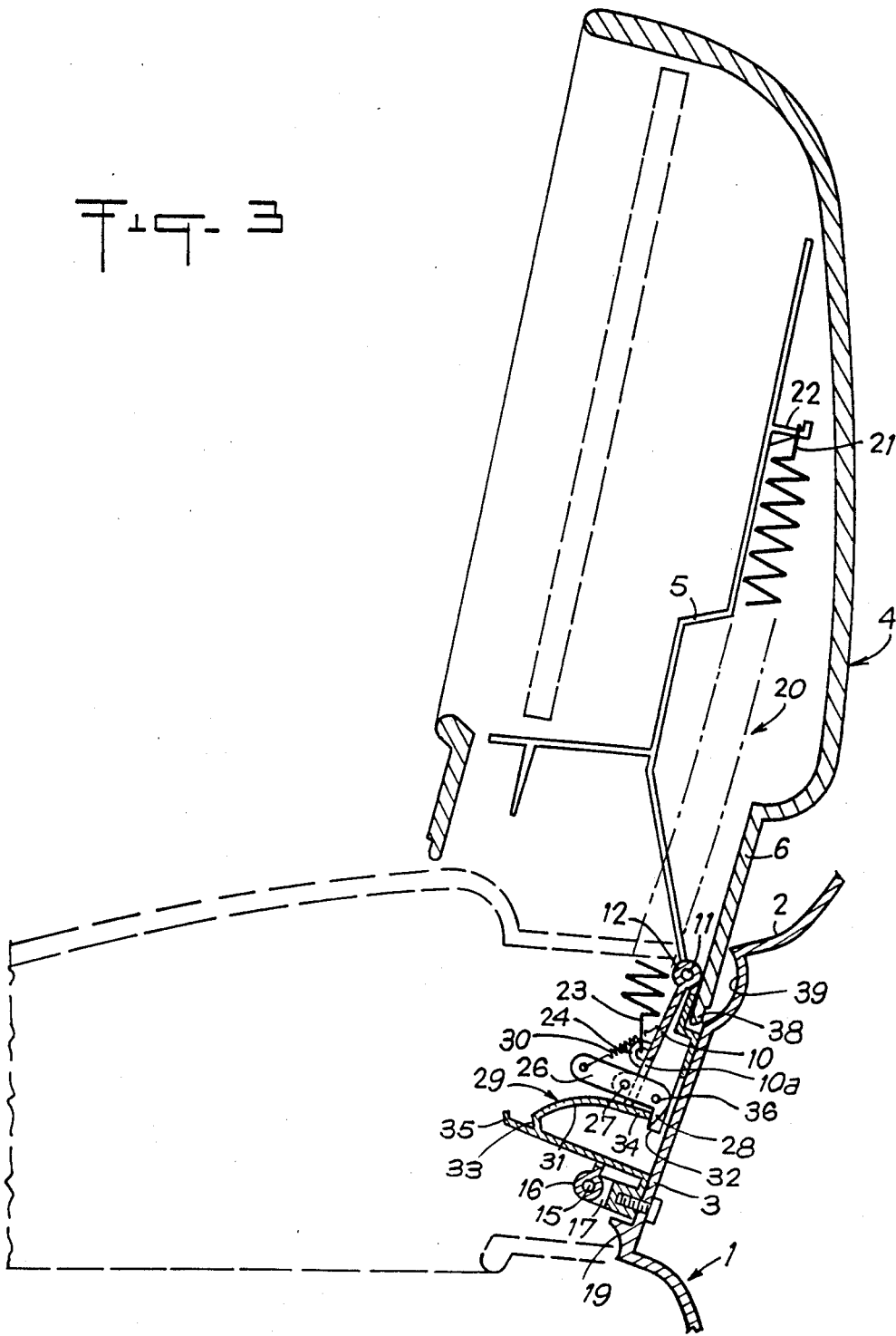
FIG. 3 is a view similar to FIG. 2 illustrating the position of forward retraction.
Figure 4:
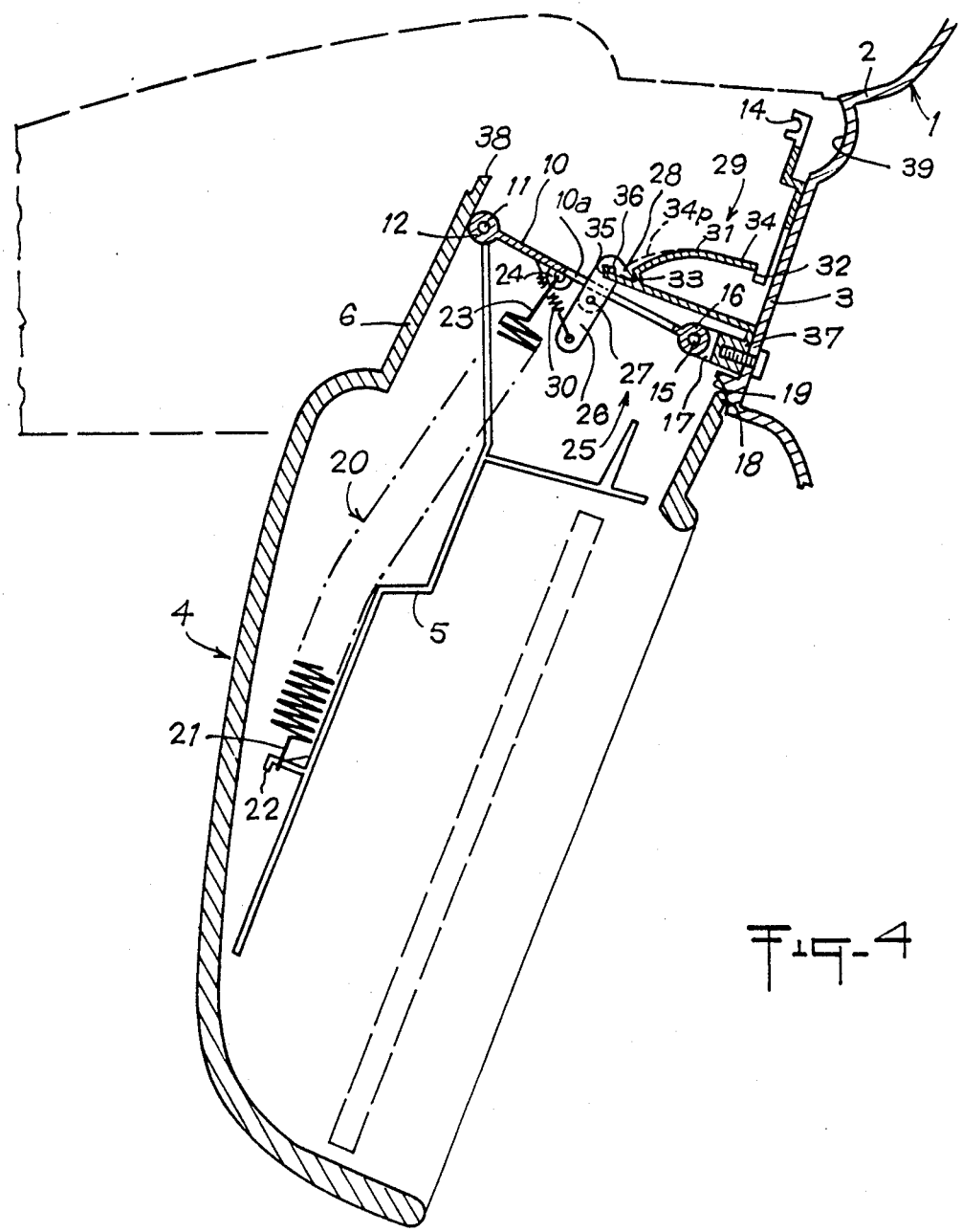
FIG. 4 is a view similar to FIG. 2 for the parking position corresponding to the maximum rearward retraction.
Figure 5:
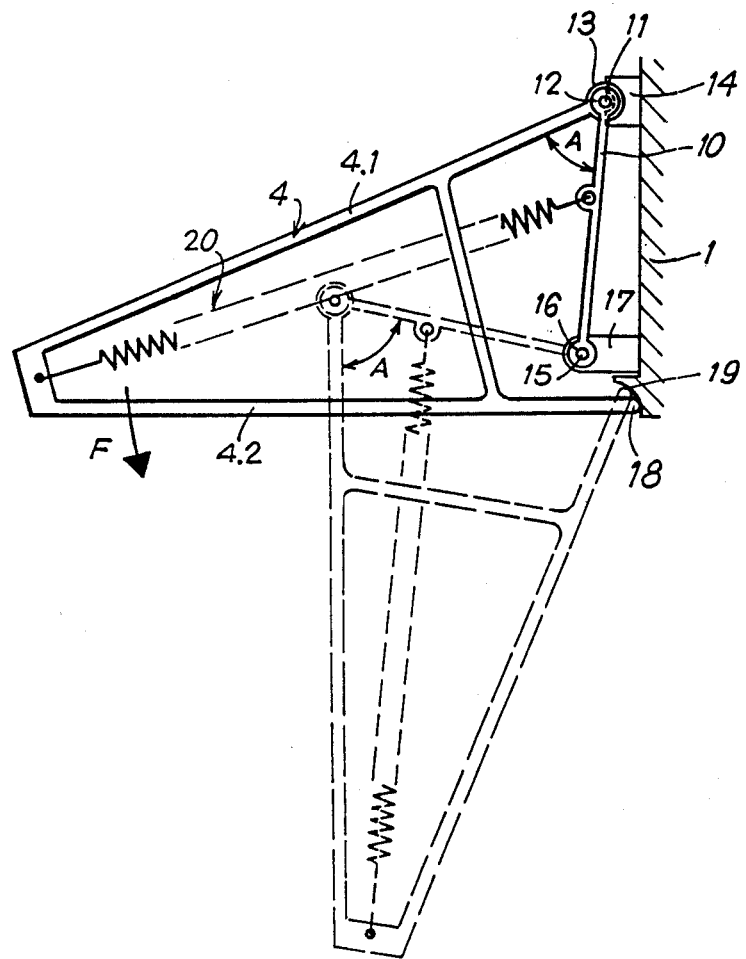
FIG. 5 is a schematic view showing, for FIGS. 2 and 4, the deformation of the means for connecting the casing.

In this same example and as shown in FIGS. 4 and 5, the pivot shaft 11 projects from the branches of the fork joint 13 and its ends are capable of fitting in half-bearings 14 forming part of the bottom 3 of the base 1. The half-bearings 14 fit with a minimum clearance on the branches of the fork joint. Of course, the half-bearings 14 may be formed on the branches of the fork joint 13 in order to cooperate with journals forming part of the base 1. Whatever the embodiment chosen, the pivoting member thus obtained is disconnectable, which allows the casing to pivot rearwardly (FIG. 4) as explained hereinafter. However, when this pivoting member is reconnected (FIG. 2), pivoting of the casing forwardly (FIG. 3) is possible by its intermediary without difficulty, being given that the modes of pivoting the casing 4 on the tilting piece 10 and the casing 4 on the base 1 are coaxial. Upon forward pivoting, a front edge 38 of the casing describes a circular path centered on the axis of the pivot shaft 11 and very close to the wall of a cylindrical relief 39 of the base 1.

In the example mentioned above and as shown in FIGS. 2, 4 and 6, the permanent rearward pivoting of the tilting piece 10 relative to the base 1 is effected by means of a shaft 15 passing through a sleeve 16 of the tilting piece 10 and a fork joint 17 forming part of the bottom 3 of the base 1. In the same way as for the previous shaft, the branches of the fork joint fit on the sleeve with a minimum clearance on the ends thereof.

In the above example and as may be seen in FIGS. 2 and 4, the rearward sliding pivoting of the casing 4 relative to the base 1 is effected by a part 18 of the rear edge of the casing maintained in permanent contact with a curved ramp 19 projecting outwardly on the bottom 3 of the casing 1.

As shown in FIG. 6, the shafts 11 and 15 are convergent in order to respect the standards of retraction.

In addition to the kinematic means described hereinabove, the rearview mirror includes an elastic return member 20, such as a helical draw spring, of which one end 21 is fastened on a tab 22 of the mount 5 of the casing 4 and of which the other end 23 is fastened to a ring 24 of the tilting piece 10. A locking device 25 with elastic return is provided for immobilizing the casing 4 relative to the base 1 in the position for use (FIG. 2), the parking position (FIG. 4), and the position of forward retraction (FIG. 3). The locking device also maintains contact during forward and rearward pivoting.

In the example shown, the locking device 25 has a lever 26 passing through an opening 10a in the tilting piece 10 on which the lever is mounted to pivot in its median part about an axis 27. At its end located towards the base 1, the lever 26 presents a projecting tooth 28 oriented towards a cam 29 and, at its opposite end located on the other side, the lever 26 is connected to the tilting piece 10 by a spring 30 tending to apply the tooth against the cam.

In this example, the cam 29 which also passes through the opening 10a of the tilting piece 10, presents an arcuate part 31 and end locking notches 32 and 33. The part 31 is arcuate concentrically to the axis of the shaft 15 and is connected by a ramp 34 with an increasing radius to the notch 32 for locking in the position of use (FIG. 2). The part 31 may also be connected by a ramp 34p with increasing radius to the notch 33 for locking in a parking position (FIG. 4).

The parking position is defined by a fixed stop element 35 capable of cooperating with a mobile stop 36 moving with the tilting piece 10. In the example shown, the stop element 35 is a tab of the cam 29 and the stop 36 is a finger projecting laterally on the lever 26 near the tooth 28.

A reinforcement 37 is advantageously added and fixed on the bottom 3 of the base 1. Like the tilting piece 10, it is constituted by a thermoplastic or non-ferrous injected material or by a molded or stamped metal alloy, these materials being rigid and resistant. The reinforcement presents, in projection, the front half-bearings 14, the cam 29, and the rear fork joint 17.

In order to readily understand the operation of the kinematics produced, reference may be made to FIG. 5 which schematically shows the casing 4 in the form of rigid compasses. The tilting piece 10 is articulated on the front leg 4.1 of the compasses via the pivot shaft 11 which rests on the half-bearings 14 of the base 1, the tilting piece 10 forming with the front leg 4.1 the angle A in the position of use shown in solid lines. The tilting piece 10 is articulated rearwardly on the base 1 via the shaft 15. A rear leg 4.2 of the compasses constituting the casing is articulated in a sliding manner by its part or end 18 on the curved ramp 19 of the base 1. The spring 20 connecting the apex of the compasses to the tilting piece 10 tends to reduce the angle A. The lever 26 and cam 29 (not shown in FIG. 5) make it possible to immobilize the tilting piece 10 relative to the base in the positions of use (FIG. 2), of forward retraction (FIG. 3), and of rearward retraction or parking (FIG. 4).

When the casing 4 is pivoted rearwardly in the direction of the arrow F, the pivot shaft 11 of the compasses leaves the half-bearings 14 of the base; the tilting piece 10 pivots about the fixed axis of the shaft 15 of the base, while the rear leg 4.2 of the compasses or casing 4 pivots by its end or edge 18 on the curved ramp 19 of the base by sliding. This sliding results from the fact that the triangle formed by the pivot shaft 11, the shaft 15, and the end 18 must be deformable (compare the triangle on the solid-line representation of FIG. 5 concerning the position of use with the triangle on the brokenline representation of FIG. 5 concerning parking position) for angle A formed by the tilting piece 10 and the front leg 4.1 to increase during rearward pivoting in the direction of arrow F and thus for the spring 20 to extend more (compare angles A and the lengths of the spring 20 for the two positions illustrated in FIG. 5).

Under these conditions, rearward retraction (arrow F) of the rearview mirror is accompanied by an excess tension of the spring 20, tending to return the mirror towards the position of use.

In fact, antagonistic effects occur. It is a question of the friction of the tooth 28 on the cam 29, the friction of the edge 18 of the casing 4 on the curved ramp 19 of the base 1 and of the resistance opposed when the knuckle-joint type alignment of the points forming the triangle (11, 15, and 18) is overstepped. These antagonistic effects make it possible, if the spring 20 is very powerful, to attenuate the elastic return that it generates or, if it is less powerful, to assist the operator who is controlling by the hand the return of the rearview mirror towards the position of use. In any case, the return pivoting is dampened to such an extent that it is impossible to pinch one's fingers between the casing and the base, which constitutes a security measure particularly for young people who are tempted to disengage the rearview mirrors from the parking position.

As indicated hereinabove, the rearview mirror is elastically locked by the tooth 28 when the tooth 28 projects into the notch 32 for the position of use and into the notch 33 for the parking position. Unlocking is automatic by manipulating the casing 4 by hand or by a shock to pivot it. To that end, the tooth 28 is V-shaped and its sides extend substantially symmetrically with respect to the radius of the shaft 15 terminating on the tooth. In this way, the sides are slightly open during pivoting of the tilting piece 10 about the axis of the shaft 15 and by reaction against those of the locking notches 32 and 33, provoke the pivoting for unlocking of the lever 26 against the action of the spring 30. In order to stretch the spring more when it is a question of locking in the position of use (FIG. 2), the tooth 28 must, before reaching the locking notch 32, overstep the ramp 34 with increasing radius of the cam 29. In the same way, in order to stretch the spring 30 more when it is a question of locking in the parking position (FIG. 4), the tooth 28 may, before reaching the locking notch 33, overstep the ramp 34p with increasing radius of the cam 29.

Furthermore, it is advantageous to prevent going beyond the parking position (FIG. 4), by means of the mobile stop 36 of the lever 26 against the fixed stop element 35 of the cam 29. Of course, the stop and the stop element may be located elsewhere, for example on the fork joint 17 and the tilting piece 10.

It will be apparent that the invention is not to be limited to the specific structure illustrated in the drawings and discussed above. It is recognized that others skilled in the art may modify or make changes within the scope of the invention as disclosed herein and set forth in the appended claims.

What is claimed is:

1. A retractable rearview mirror self-locked in a position for parking and in a position of use with return without risk of pinching the fingers, comprising a base adapted to be fixed on a vehicle, a casing for holding a mirror applied, in said position of use, against said base via two pivoting members distant from each other in a front-to-rear direction, a spring tending to maintain contact between said casing and said base, as well as a mirror disposed in said casing and mobile relative thereto under the action of a a control device, wherein said retractable rearview mirror also comprises a front-to-rear tilting piece disposed near said base in said casing, articulated by means of a front pivoting member for permanent forward pivoting relative to said casing and a rear pivoting member for permanent rearward pivoting relative to said base and coupled between said front pivoting and rear pivoting members to said casing by a return spring, said casing further being connected to said base at the front by a retractable pivoting member and the rear by a sliding pivoting member located nearer said base than said rear pivoting member of said tilting piece and more to the rear than said rear pivoting member, so that, when said casing pivots from front to rear, said tilting piece pivots relative thereto, moving away from the point of attachment of said return spring in said casing and stretches said return spring more, and a locking member with elastic return mounted on said tilting piece and cooperating selectively with two locking notches in said base defining said position of use of said casing and said position for parking.

2. The rearview mirror of claim 1, wherein said front pivoting member and said retractable pivoting member of said tilting piece are coaxial.

3. The rearview mirror of claim 2, wherein said front pivoting member is a shaft passing through a sleeve and a fork joint integral, respectively, with said tilting piece and said casing, and wherein said retractable pivoting member is constituted by at least one half-bearing integral with said base which is engaged by said shaft when said case is in said position of use.

4. The rearview mirror of claim 1, wherein said rear pivoting member is a shaft passing through a sleeve and a fork joint integral, respectively, with said tilting piece and said base.

5. The rearview mirror of claim 1, wherein said sliding pivoting member is constituted by said return spring producing a force abutting an edge of said casing against a ramp of said base projecting outwardly.

6. The rearview mirror of claim 1, wherein said locking member is a locking lever mounted to pivot on said tilting piece and having a projecting tooth capable of cooperating selectively with said two locking notches of a cam forming part of said base.

7. The rearview mirror of claim 6, wherein said cam has an arcuate part concentric with said rear pivoting member of said tilting piece, said arcuate part being connected to a first locking notch of said two locking notches in said position of use by a ramp with increasing radius.

8. The rearview mirror of claim 7, wherein said arcuate part of said cam is also connected to a second locking notch of said two locking notches for locking in said parking position by a ramp with increasing radius.

9. The rearview mirror of claim 6, wherein said tooth of said locking lever is shaped as a V oriented so that its two sides are slightly open during pivoting in the two directions of said tilting piece about its rear pivoting axis.

10. The rearview mirror of claim 6, wherein a stop element forming part of said base is capable of cooperating with a stop provided on said tilting piece in order to define said parking position of said casing.

11. The rearview mirror of claim 10, wherein said stop is finger projecting laterally from said locking lever near said tooth and said stop element is a tab projecting from said cam near said second locking notch for locking said casing in said parking position.

12. The rearview mirror of claims 4 or 6, wherein said at least one half-bearing, said cam and a fixed pivot member about which said rear pivoting member of said tilting piece is pivoted are part of a reinforcement added and fixed on said base, said cam and said locking lever passing through an opening provided in said tilting piece.

* * * * *